(12) United States Patent
Juillard

(10) Patent No.: US 9,479,563 B2
(45) Date of Patent: Oct. 25, 2016

(54) ADAPTIVE CONFIGURATION MANAGEMENT DATABASES

(71) Applicant: salesforce.com, inc., San Francisco, CA (US)

(72) Inventor: Loic Juillard, Novato, CA (US)

(73) Assignee: salesforce.com, inc., San Francisco, CA (US)

( * ) Notice: Subject to any disclaimer, the term of this patent is extended or adjusted under 35 U.S.C. 154(b) by 103 days.

(21) Appl. No.: 13/841,631

(22) Filed: Mar. 15, 2013

(65) Prior Publication Data

US 2014/0280306 A1    Sep. 18, 2014

Related U.S. Application Data

(60) Provisional application No. 61/736,630, filed on Dec. 13, 2012.

(51) Int. Cl.
*G06F 17/30* (2006.01)
*H04L 29/08* (2006.01)
*H04L 12/24* (2006.01)

(52) U.S. Cl.
CPC ......... *H04L 67/00* (2013.01); *G06F 17/30073* (2013.01); *G06F 17/30477* (2013.01); *H04L 41/0816* (2013.01); *H04L 67/2814* (2013.01); *H04L 67/34* (2013.01); *H04L 67/12* (2013.01)

(58) Field of Classification Search
CPC ................... G06F 17/30477; G06F 17/30073; H04L 67/34; H04L 67/2814; H04L 67/12; H04L 41/0816; H04L 67/00
USPC .................................. 707/769, 802
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,088,693 | A | 7/2000 | Van Huben et al. |
| 6,092,083 | A | 7/2000 | Brodersen et al. |
| 6,169,534 | B1 | 1/2001 | Raffel et al. |

(Continued)

OTHER PUBLICATIONS

Kandasamy, Madhusudanan, et al., "Building Scalable Cloud-based Communication and Collaboration Services for SMB Enterprises", SRII 2011, San Jose, CA, Mar. 29-Apr. 2, 2011, pp. 59-66.*

(Continued)

*Primary Examiner* — Robert Stevens
(74) *Attorney, Agent, or Firm* — Blakely, Sokoloff, Taylor & Zafman

(57) ABSTRACT

Adaptive configuration database management. An adaptive configuration management database (ACMDB) system receives a request message for configuration data from a requesting device. The request is for configuration data for a device coupled with the ACMDB. In response to the request, the ACMDB provides a response message with indicators for sources of configuration data rather than the configuration data.

19 Claims, 6 Drawing Sheets

(56) References Cited

U.S. PATENT DOCUMENTS

| | | | |
|---|---|---|---|
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,256,635 B1* | 7/2001 | Arrouye et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,204 B1* | 8/2004 | Hansen | 709/220 |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,340,411 B2 | 3/2008 | Cook | |
| 7,620,655 B2 | 11/2009 | Larsson et al. | |
| 7,685,167 B2* | 3/2010 | Mueller | 707/999.2 |
| 7,933,869 B2* | 4/2011 | Becker et al. | 707/625 |
| 8,112,451 B1* | 2/2012 | Graham | G06Q 10/08 707/802 |
| 8,161,047 B2* | 4/2012 | Akiyama et al. | 707/736 |
| 8,321,549 B2* | 11/2012 | Isobe et al. | 709/223 |
| 8,434,129 B2* | 4/2013 | Kannappan et al. | 726/3 |
| 8,732,200 B2* | 5/2014 | Tootill | 707/781 |
| 2001/0010055 A1 | 7/2001 | Hirabayashi | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0090731 A1* | 4/2005 | Minogue et al. | 600/407 |
| 2005/0091098 A1 | 4/2005 | Brodersen et al. | |
| 2005/0114097 A1 | 5/2005 | Duncan | |
| 2005/0223374 A1* | 10/2005 | Wishart et al. | 717/173 |
| 2006/0230419 A1 | 10/2006 | Yoshida | |
| 2006/0288123 A1 | 12/2006 | Vered | |
| 2007/0294307 A1* | 12/2007 | Chen | G06F 17/30312 |
| 2008/0086542 A1 | 4/2008 | Mukherjee et al. | |
| 2008/0270987 A1* | 10/2008 | Weissman | 717/124 |
| 2009/0049102 A1* | 2/2009 | Weissman | 707/104.1 |
| 2009/0049288 A1* | 2/2009 | Weissman | 712/245 |
| 2009/0276405 A1* | 11/2009 | Weissman et al. | 707/3 |
| 2010/0042449 A1* | 2/2010 | Thomas | 705/7 |
| 2010/0169860 A1* | 7/2010 | Biazetti | H04L 41/0806 717/107 |
| 2011/0276693 A1* | 11/2011 | Jensen-Horne et al. | 709/226 |
| 2011/0289047 A1* | 11/2011 | Ahuja | 707/609 |
| 2011/0289509 A1* | 11/2011 | Kothari et al. | 718/106 |
| 2011/0296381 A1* | 12/2011 | Mooney | 717/122 |
| 2011/0302148 A1 | 12/2011 | Kakade et al. | |
| 2012/0005317 A1* | 1/2012 | Draca | H04L 29/12009 709/220 |
| 2012/0204267 A1* | 8/2012 | Prafullchandra | G06Q 10/06 726/25 |
| 2013/0179488 A1 | 7/2013 | Wang et al. | |
| 2013/0239106 A1* | 9/2013 | Srinivasan et al. | 718/1 |
| 2013/0297668 A1* | 11/2013 | McGrath et al. | 709/201 |
| 2013/0332900 A1* | 12/2013 | Berg et al. | 717/121 |
| 2014/0082167 A1* | 3/2014 | Robinson et al. | 709/223 |
| 2014/0149591 A1* | 5/2014 | Bhattacharya et al. | 709/226 |

OTHER PUBLICATIONS

Martinez, P., et al., "Using the Script MIB for Policy-based Configuration Management", NOMS 2002, Florence, Italy, Apr. 15-19, 2002, pp. 187-202.*

Rochwerger, Benny, et al., "The Reservoir model and architecture for open federated cloud computing", IBM J. Res. & Dev., vol. 53, No. 4, Paper 4, Jul. 2009, pp. 4:1-4:11.*

(56) References Cited

OTHER PUBLICATIONS

Microsoft Computer Dictionary, 5th Edition, Microsoft Press, Redmond, WA, © 2002, pp. 410, 444 and 542.*

Hagen, Sebastian, et al., "Planning in the Large: Efficient Generation of IT Change Plans on Large Infrastructures", CNSM 2012, Las Vegas, NV, Oct. 22-26, 2012, pp. 108-116.*

Verma, D. C., "Chapter 7: Configuration Management", Principles of Computer Systems and Network Management, Springer Science+Business Media, LLC, © 2009, pp. 165-189.*

The Microsoft Computer Dictionary, 5th Edition, Microsoft Press, Redmond, WA, (c) 2002, pp. 19, 244-245, 410, 547 and 553.*

Non-Final Office Action for U.S. Appl. No. 13/841,153 mailed Mar. 12, 2015, 8 pages.

\* cited by examiner

ADAPTIVE CONFIGURATION MANAGEMENT DATABASES

CLAIM OF PRIORITY

This application claims the benefit of U.S. Provisional Patent Application No. 61/736,630, entitled "Adaptive CMDB" by Loic Juillard, filed Dec. 13, 2012.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to a mechanism for facilitating adaptive configuration management databases.

BACKGROUND

A configuration management database (CMDB) is a repository of information related to components of an information system. It contains the details of the configuration items in the system infrastructure. Typically, a CMDB represents the authorized configuration of the significant components of the computing/network environment.

A CMDB helps an organization understand the relationships between these components and track their configuration. CMDB implementations often involve federation, the inclusion of data into the CMDB from other sources, such as Asset Management, in such a way that the source of the data retains control of the data.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Figure 1:
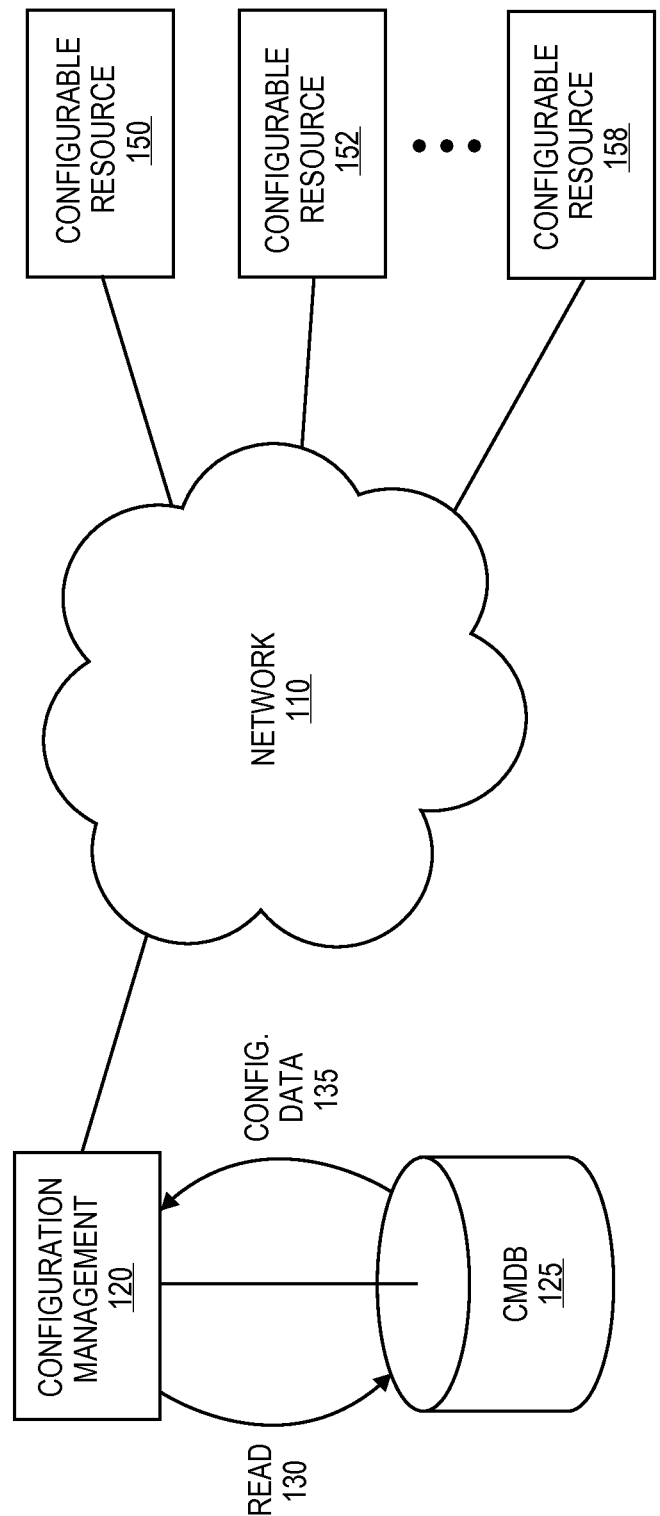
FIG. 1 is a block diagram of one embodiment of a configuration management database system.

Methods and systems are provided for facilitating adaptive configuration management databases are described. In one embodiment, in a highly distributed environment, a configuration management database (CMDB) is used to store, process and serve configuration data to various elements of the environment. The CMDB facilitates the ability to centralize all configuration items into a single system. The configuration items can include, for example, laptop configurations, mobile device configurations, hard drive images, printer configurations, server configurations, etc.

A centralized CMDB architecture simplifies data management. Typically, CMDB architectures offer reconciliation capabilities where the CMDB can import data from multiple sources of information and reconcile the data with any number of pre-set criteria. If the CMDB cannot reconcile the data, the CMDB can include workflows for escalation, alerting and/or additional processing, etc.

While conceptually, this approach may appear straight forward, managing a CMDB can be very complex. Often, the CMDB is not used as a source of data, rather the CMDB relies on discovered information from external services. Because the reconciliation may be performed asynchronously the CMDB is often behind on changes. Also, the authoritative source of information often changes over time without updates to the CMDB, which can render the CMDB data obsolete.

To address these issues, in one embodiment, the CMDB system is leveraged to manage changes in the environment. In one embodiment, the CMDB system retains the idea of a centralized source of data as can offer advantages in terms of automation, but provides a different approach in the way data is handled by the CMDB server to overcome some or all of the shortcomings listed above.

In one embodiment, an adaptive CMDB (or ACMDB) system resolves may of the issues listed above. In one embodiment, the ACMDB does not store data, but stores references to data. Conceptually, the ACMDB acts more as a broker than as a record holder. In one embodiment, the ACMDB provides information to client devices about how to gather configuration data rather than providing the configuration data.

In one embodiment, data is stored as a pointer to a system with a data collection handler. The system can include a data schema and delivery process that allows the system to maintain the correct pointer and configuration item. This system may also allow processes or workflows to modify the descriptor.

In one embodiment, the ACMDB can be part of a multi-tenant database system. As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one of one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2®, by IBM and the like without departing from the scope of the embodiments claimed. Alternatively, the techniques described herein may be utilized in non-database environments, for example, updates for a CNC machining process, or a manufacturing process, or a shipping process can be provided as described herein.

FIG. 1 is a block diagram of one embodiment of a configuration management database system. Network 110 can be any type of network, wired and/or wireless, that provides an interconnection between electronic devices. Network 110 operates to connect configuration management device 120 with configurable devices 150, 152 and 158.

Configuration management device 120 operates with configuration management database 125 to provide configuration information to one or more configurable resources (e.g., 150, 152, ..., 158). In response to a request for configuration data, configuration management device 120 accesses CMDB 125 (e.g., read 130) to retrieve configuration data 135.

Figure 2:
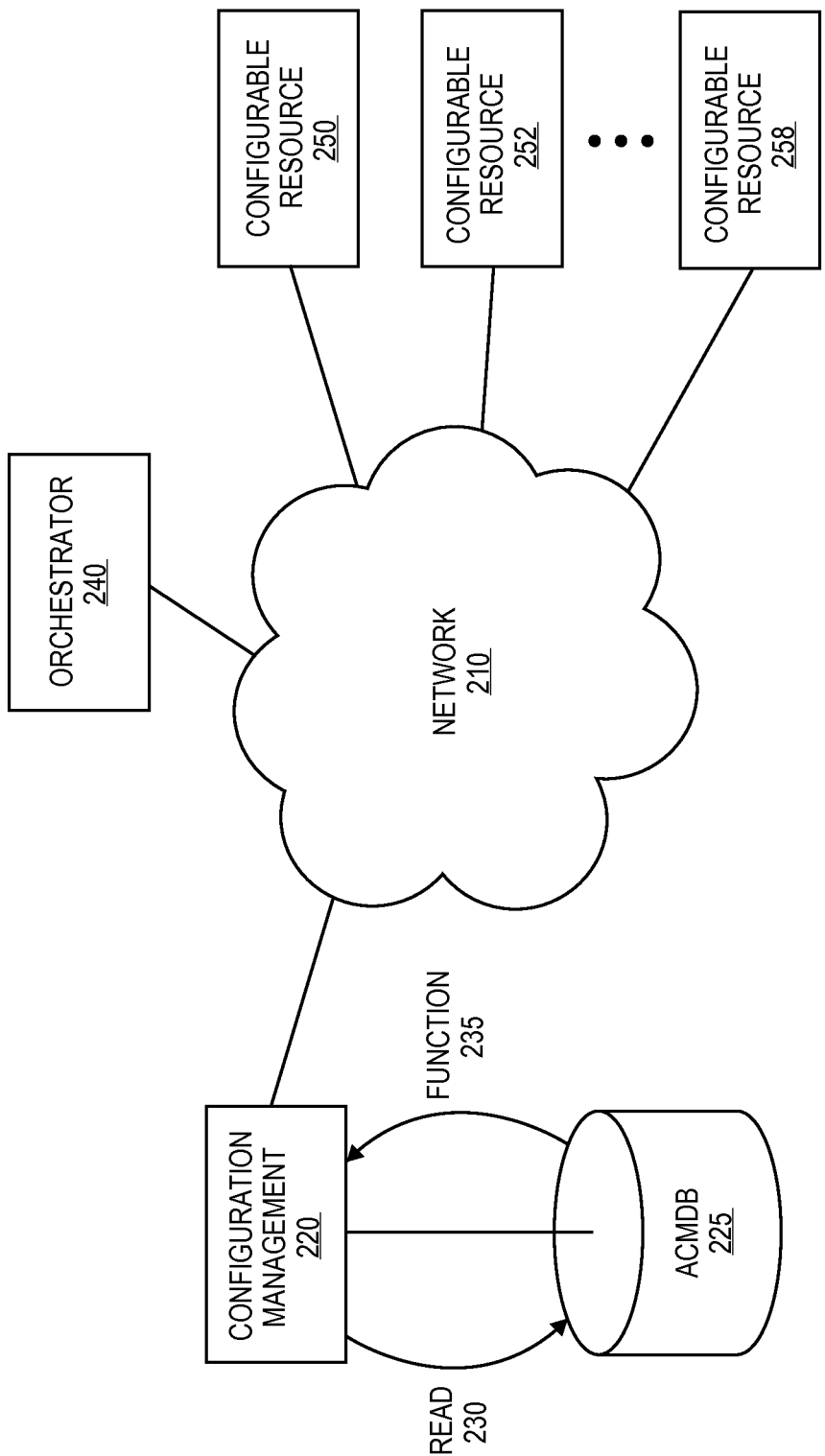
FIG. 2 is a block diagram of one embodiment of an adaptive configuration management database system.

FIG. 2 is a block diagram of one embodiment of an adaptive configuration management database system. Network 210 can be any type of network, wired and/or wireless, that provides an interconnection between electronic devices. Network 210 operates to connect configuration management device 220 with configurable devices 250, 252 and 258. The configurable devices can be any type of device that is configurable by a user/administrator/etc. For example, the configurable devices can be laptop or desktop computer systems, tablets, printers, facsimile machines, servers, security systems, scanners, sensors, copiers, cameras, and/or any other electronic device.

Configuration management device 220 operates with configuration management database 225 to provide configuration information to one or more configurable resources (e.g., 250, 252, ..., 258) and or orchestrator 240. In response to a request for configuration data, configuration management device 220 accesses ACMDB 225 (e.g., read 230) to retrieve a serialized function 235.

Serialized function 235 provides information for the process to configure the target device. In one embodiment, serialized function 235 can be a script for a process to configure the target device and/or for the device to configure itself. In one embodiment, orchestrator 240 executes serialized function 235 to configure the target device. Serialized function 235 is considered serialized in the sense that it can contain ordering information for configuration purposes and that it contains a process for configuration and not the configuration data itself.

Serialized function 235 indicates one or more functions (as well as an ordering) to be performed to configure the target device. The device(s) controlling the configuration perform the operations specified by serialized function 235. For example, serialized function 235 may include a command/instruction/function to cause a device to gather configuration from a specified location accessible by the configuring device(s). The configuring device(s) can then perform the specified actions to configure the target device.

By providing pointers or other indicator of where to find current configuration information, current information can be provided without the need to coordinate updates to the configuration database. This simplifies database management and can provide more efficient configuration.

Figure 3:
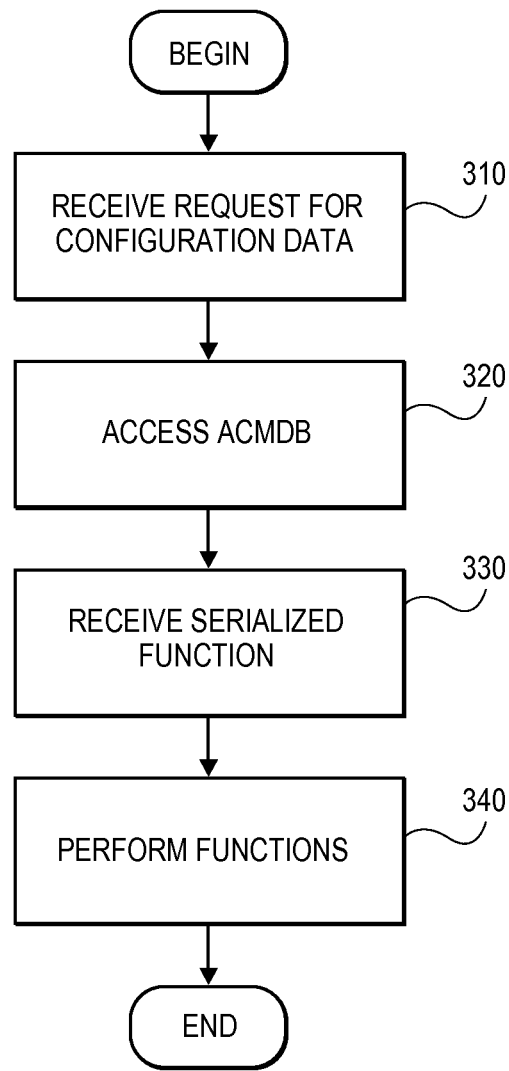
FIG. 3 is a flow diagram of one embodiment of device configuration utilizing an adaptive configuration management database.

FIG. 3 is a flow diagram of one embodiment of device configuration utilizing an adaptive configuration management database. In one embodiment, the process of FIG. 3 operates within a multi-tenant database environment. In other embodiments, the process of FIG. 3 does not within a multi-tenant database environment.

A request for configuration information is received, 310. The receiving device can be a server (or other computing device) running a configuration management database system capable of processing and responding to the request. The request can be received from a target device to be configured and/or from another device controlling configuration of the target device.

The database management system accesses the ACMDB, 320. This may be a read or any other type of database access. The access can be based on an identifier of the target device, an indication of target device type, an indication of target device location and/or other identifying or characterizing information corresponding to the target device.

The database management system receives from the ACMDB a serialized function, 330. The serialized function provides information for how to to configure the target device and not the configuration data itself, as in current CMDB systems. In one embodiment, the serialized function can be a script for a process to configure the target device and/or for the device to configure itself. In one embodiment, an orchestrator executes some or all of the serialized function to configure the target device.

The serialized function indicates one or more functions (as well as an ordering) to be performed to configure the target device, 340. The device(s) controlling the configuration perform the operations specified by the serialized function. For example, the serialized function may include a command/instruction/function to cause a device to gather configuration from a specified location accessible by the configuring device(s). The configuring device(s) can then perform the specified actions to configure the target device.

Figure 4:
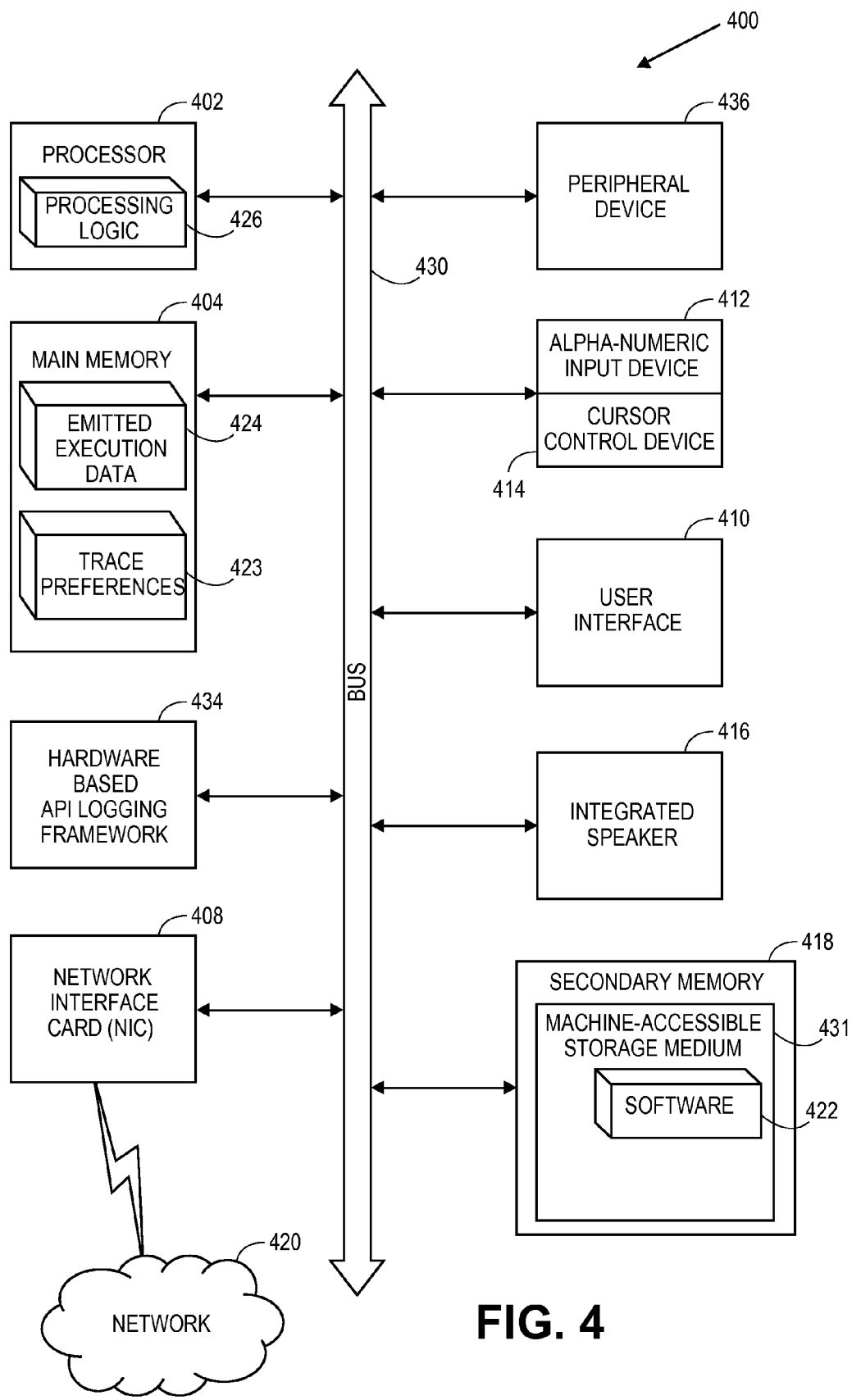
FIG. 4 is a block diagram of one embodiment of a computer system.

FIG. 4 illustrates a diagrammatic representation of a machine 400 in the exemplary form of a computer system, in accordance with one embodiment, within which a set of instructions, for causing the machine 400 to perform any one or more of the methodologies discussed herein, may be executed. Machine 400 is the same as or similar to configuration management device 220 and/or configurable devices 250, 252, 258 of FIG. 2. In alternative embodiments, the machine may be connected (e.g., networked) to other machines in a Local Area Network (LAN), an intranet, an extranet, or the Internet.

The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 418 (e.g., a persistent storage device including hard disk drives and persistent multi-tenant data base implementations), which communicate with each other via a bus 430. Main memory 404 includes emitted execution data 424 (e.g., data emitted by a logging framework) and one or more trace preferences 423 which operate in conjunction with processing logic 426 and processor 402 to perform the methodologies discussed herein.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like.

The computer system 400 may further include a network interface card 408. The computer system 400 also may include a user interface 410 (such as a video display unit, a liquid crystal display (LCD), or a cathode ray tube (CRT)), an alphanumeric input device 412 (e.g., a keyboard), a cursor control device 414 (e.g., a mouse), and a signal generation device 416 (e.g., an integrated speaker). The computer system 400 may further include peripheral device 436 (e.g., wireless or wired communication devices, memory devices, storage devices, audio processing devices, video processing devices, etc. The computer system 400 may further include a Hardware based API logging framework 434 capable of executing incoming requests for services and emitting execution data responsive to the fulfillment of such incoming requests.

The secondary memory 418 may include a machine-readable storage medium (or more specifically a machine-accessible storage medium) 431 on which is stored one or more sets of instructions (e.g., software 422) embodying any one or more of the methodologies or functions of dynamic adaptive configuration management database systems described herein. The software 422 may also reside, completely or at least partially, within the main memory 404 and/or within the processor 402 during execution thereof by the computer system 400, the main memory 404 and the processor 402 also constituting machine-readable storage media. The software 422 may further be transmitted or received over a network 420 via the network interface card 408. The machine-readable storage medium 431 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 5:
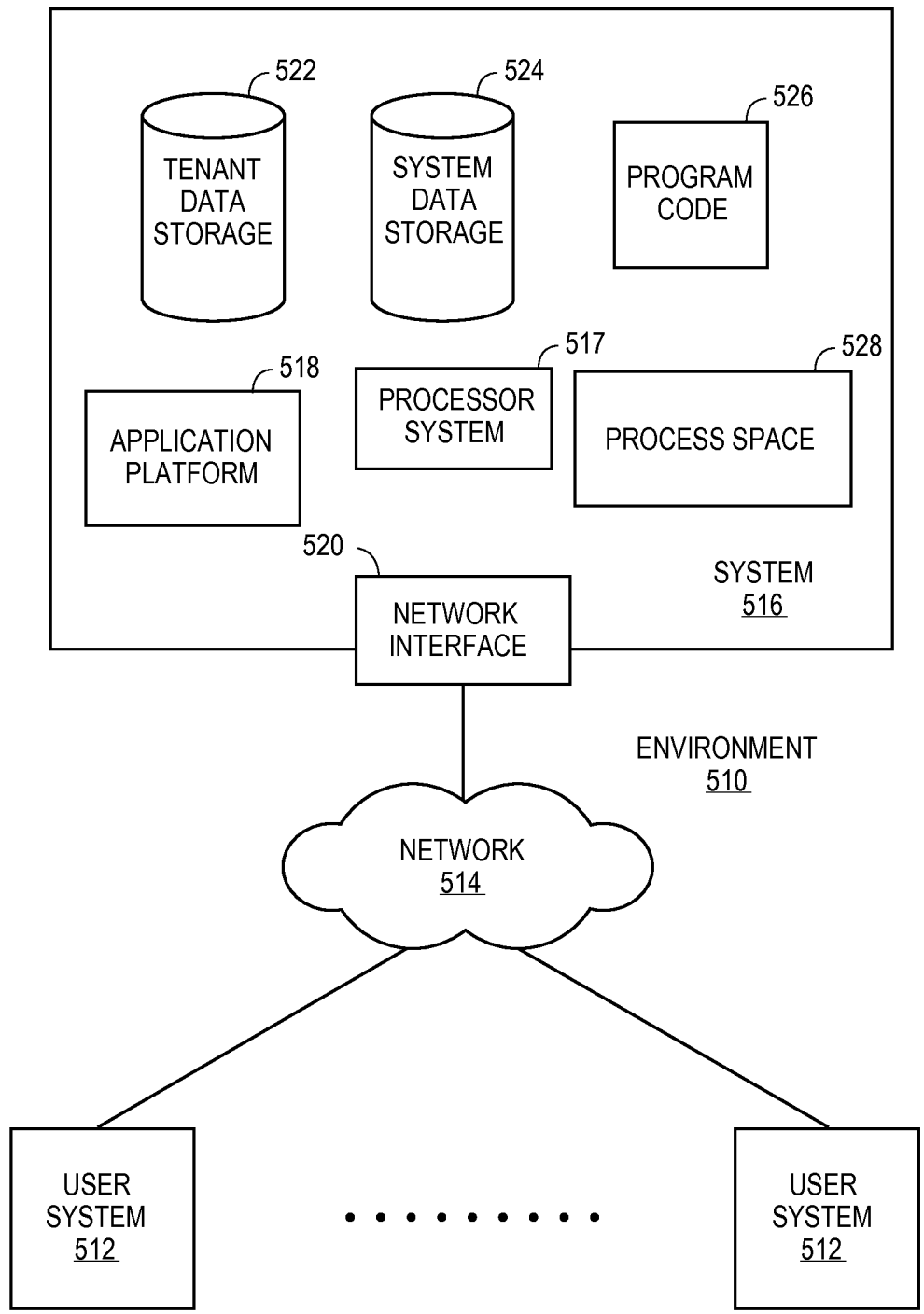
FIG. 5 is a block diagram of one environment wherein an on-demand database service might be used.

FIG. 5 illustrates a block diagram of an environment 510 wherein an on-demand database service might be used. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in herein FIG. 5 (and in more detail in FIG. 6) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
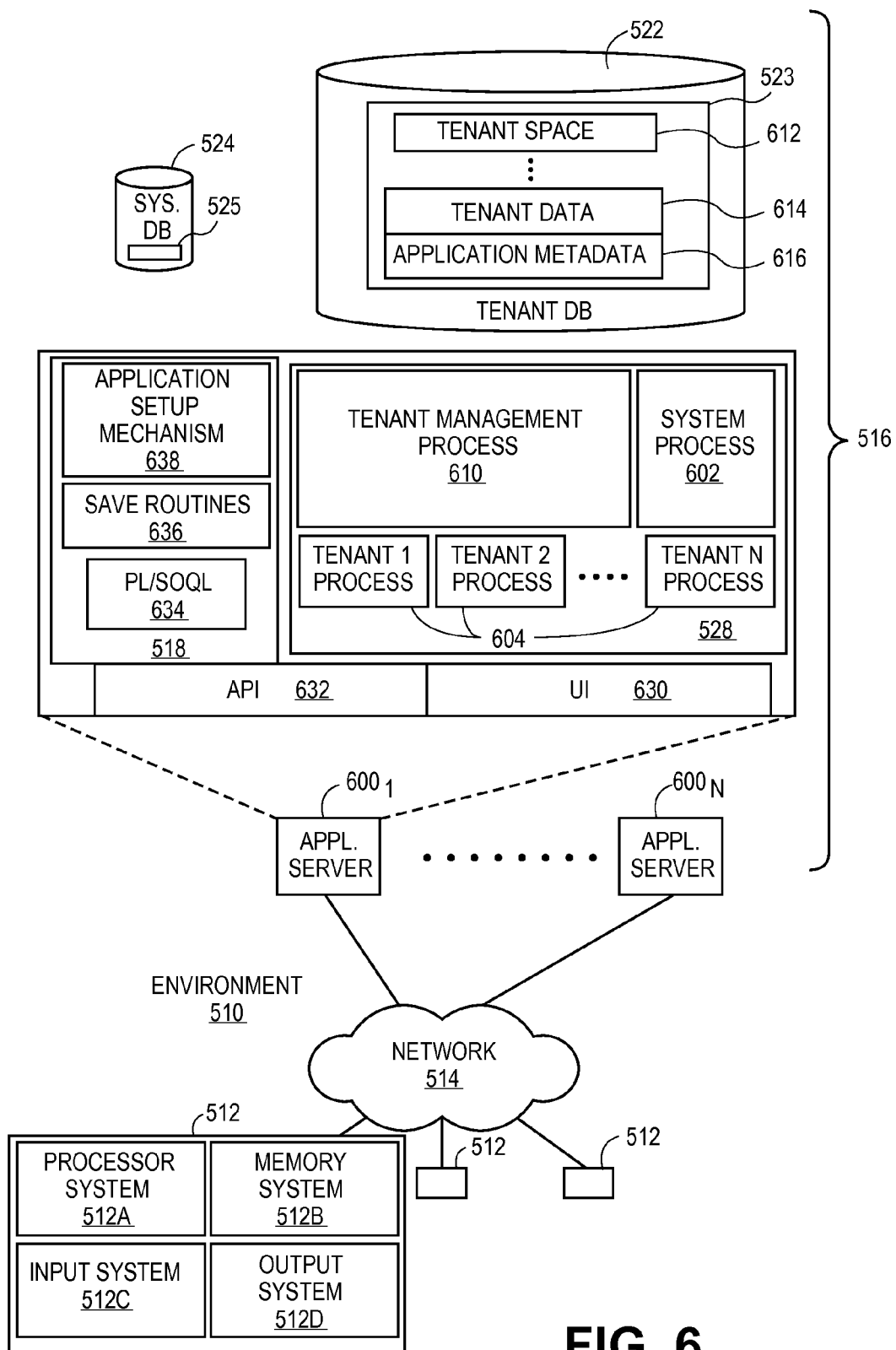
FIG. 6 is a block diagram of one embodiment of elements of environment of FIG. 5 and various possible interconnections between these elements.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server 600$_1$ might be coupled via the network 514 (e.g., the Internet), another application server 600$_{N-1}$ might be coupled via a direct network link, and another application server 600$_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A method comprising:
    receiving, with an adaptive configuration management database (ACMDB) system running on a computing device, a request for configuration data from a requesting device, the request for configuration data for one or more devices coupled with the ACMDB, wherein the ACMDB stores data as a pointer to one or more systems with a data collection handler;
    providing to the requesting device with the ACMDB, in response to the request, a response comprising at least one or more serialized function provides information for how to configure the target device and not the configuration data itself, wherein the serialized function includes at least one function to cause the requesting device to gather configuration information from a specified location accessible by the requesting device; and
    updating pointer descriptors in the ACMDB utilzing a data schema and delivery process corresponding to the ACMDB in response to changes in corresponding configuration data or in response to changes in a location of corresponding configuration data.

2. The method of claim 1 wherein the response comprises at least a serialized function.

3. The method of claim 2 wherein the serialized function comprises at least a script for a process to configure a remote device.

4. The method of claim 1 wherein the requesting device comprises an orchestrator that configures a remote device utilizing the configuration data.

5. The method of claim 1 wherein the response comprises at least one or more pointers to configuration data stored by one or more remote devices.

6. The method of claim 1 wherein the ACMDB is part of a multitenant environment.

7. The method of claim 6 wherein the multitenant environment stores data for multiple client entities, each identified by a tenant identifier (ID) having one of one or more users associated with the tenant ID, users of each of multiple client identities can only access data identified by a tenant ID associated with the respective client entity, and the multitenant environment is at least a hosted database provided by an entity separate from the client entities, and provides on-demand database service to the client entities.

8. A non-transitory computer-readable medium, having stored thereon instructions that, when executed by one or more processors, cause the one or more processors to:
    receive, with an adaptive configuration management database (ACMDB) system running on a computing device, a request for configuration data from a requesting device, the request for configuration data for one or more devices coupled with the ACMDB, wherein the ACMDB stores data as a pointer to one or more systems with a data collection handler;
    provide to the requesting device with the ACMDB, in response to the request, a response comprising at least one or more serialized function provides information for how to configure the target device and not the configuration data itself, wherein the serialized function includes at least one function to cause the requesting device to gather configuration information from a specified location accessible by the requesting device; and
    update pointer descriptors in the ACMDB utilzing a data schema and delivery process corresponding to the ACMDB in response to changes in corresponding configuration data or in response to changes in a location of corresponding configuration data.

9. The non-transitory computer-readable medium of claim 8 wherein the response comprises at least a serialized function.

10. The non-transitory computer-readable medium of claim 9 wherein the serialized function comprises at least a script for a process to configure a remote device.

11. The non-transitory computer-readable medium of claim 8 wherein the requesting device comprises an orchestrator that configures a remote device utilizing the configuration data.

12. The non-transitory computer-readable medium of claim 8 wherein the response comprises at least one or more pointers to configuration data stored by one or more remote devices.

13. The non-transitory computer-readable medium of claim 8 wherein the ACMDB is part of a multitenant environment.

14. The non-transitory computer-readable medium of claim 13 wherein the multitenant environment stores data for multiple client entities, each identified by a tenant identifier (ID) having one of one or more users associated with the tenant ID, users of each of multiple client identities can only access data identified by a tenant ID associated with the respective client entity, and the multitenant environment is at least a hosted database provided by an entity separate from the client entities, and provides on-demand database service to the client entities.

15. A system comprising:
    one or more user computing systems;
    a server computing system having a plurality of hardware computing devices communicatively coupled with the one or more user computing systems via a network, the server system to provide a multitenant environment, wherein the multitenant environment includes data for multiple client entities, each identified by a tenant identifier (ID) having one of one or more users associated with the tenant ID, users of each of multiple client identities can only access data identified by a tenant ID associated with the respective client entity, and the multitenant environment is at least a hosted database provided by an entity separate from the client entities, and provides on-demand database service to the client entities, the server system further to receive, with an adaptive configuration management database (ACMDB) system running on a computing device, a request for configuration data from a requesting device, the request for configuration data for one or more devices coupled with the ACMDB, wherein the ACMDB stores data as a pointer to one or more systems with a data collection handler, to provide to the requesting device with the ACMDB, in response to the request, a response comprising at least one or more serialized function provides information for how to configure the target device and not the configuration data itself, wherein the serialized function includes at least one function to cause the requesting device to gather configuration information from a specified location accessible by the requesting device; and to update pointer descriptors in the ACMDB utilzing a data schema and delivery process corresponding to the ACMDB in response to changes in corresponding configuration data or in response to changes in a location of corresponding configuration data.

16. The system of claim 15 wherein the response comprises at least a serialized function.

17. The system of claim 16 wherein the serialized function comprises at least a script for a process to configure a remote device.

18. The system of claim 15 wherein the requesting device comprises an orchestrator that configures a remote device utilizing the configuration data.

19. The system of claim 15 wherein the response comprises at least one or more pointers to configuration data stored by one or more remote devices.

* * * * *